United States Patent
Giuliano

[19]

[11] Patent Number: 6,131,859
[45] Date of Patent: Oct. 17, 2000

[54] PIPE CLAMPING APPARATUS

[75] Inventor: Marcucci Giuliano, Treviso, Italy

[73] Assignee: Z.C.M. S.r.l., Mareno di Piave, Italy

[21] Appl. No.: 09/026,091

[22] Filed: Feb. 19, 1998

[30] Foreign Application Priority Data

Feb. 26, 1997 [IT] Italy ................................ PD97U0010

[51] Int. Cl.[7] .................................................. E21F 17/02
[52] U.S. Cl. .............................. 248/62; 411/437; 403/22; 24/279
[58] Field of Search ................................ 411/437, 999, 411/84, 85, 427, 301, 908, 439, 432; 248/62, 74.1, 68.1, 74.4, 74.2; 403/22, 383; 24/279, 285

[56] References Cited

U.S. PATENT DOCUMENTS

| | | | |
|---|---|---|---|
| 492,593 | 2/1893 | Taylor | 248/68.1 |
| 3,848,838 | 11/1974 | Thomas | 248/42 |
| 3,967,049 | 6/1976 | Brandt | 174/53 |
| 4,487,387 | 12/1984 | Heath | 248/59 |
| 4,526,756 | 7/1985 | Wong | 248/74.4 |
| 4,793,578 | 12/1988 | Howard | 248/62 |
| 5,108,055 | 4/1992 | Kreinberg et al. | 248/71 |
| 5,518,351 | 5/1996 | Peil | 411/383 |

FOREIGN PATENT DOCUMENTS

| | | | |
|---|---|---|---|
| 1562068 | 4/1969 | France | 248/68.1 |
| 2326606 | 6/1977 | France | 248/68.1 |
| 2457403 | 1/1981 | France | 248/62 |
| 2500571 | 8/1982 | France | 248/62 |
| 3625885 | 2/1988 | Germany | 248/62 |

*Primary Examiner*—Anita M. King
*Assistant Examiner*—Kimberly Wood
*Attorney, Agent, or Firm*—Bucknam and Archer

[57] ABSTRACT

The present invention refers to an improved pipe clamping apparatus. This apparatus is of the single-piece type, which comprises a first and a second arcuate wing, wherein such wings are joined to each other through a hinge that regulates their mutual arrangement from an open position to a closed position in which said arcuate wings are linked up with each other so as to form a pipe supporting ring, said apparatus being substantially characterized in that said arcuate wings comprise end portions for engaging each other, in which through-holes are provided for inserting screws therein, along with corresponding receptacles for the engagement of said screws, as well as in that from the first one of said arcuate wings there extends a hollow box-like base defining a through-hole that is so shaped as to form at least a receptacle which, being accessible from said ring, is capable of accomodating a nut for fastening to a support element, at least a tab for partially obstructing the accessibility thereof extending from each one of said through-holes of said end portions, wherein said screws, which are pre-assembled into said through-holes, are so prevented from sliding axially.

7 Claims, 2 Drawing Sheets

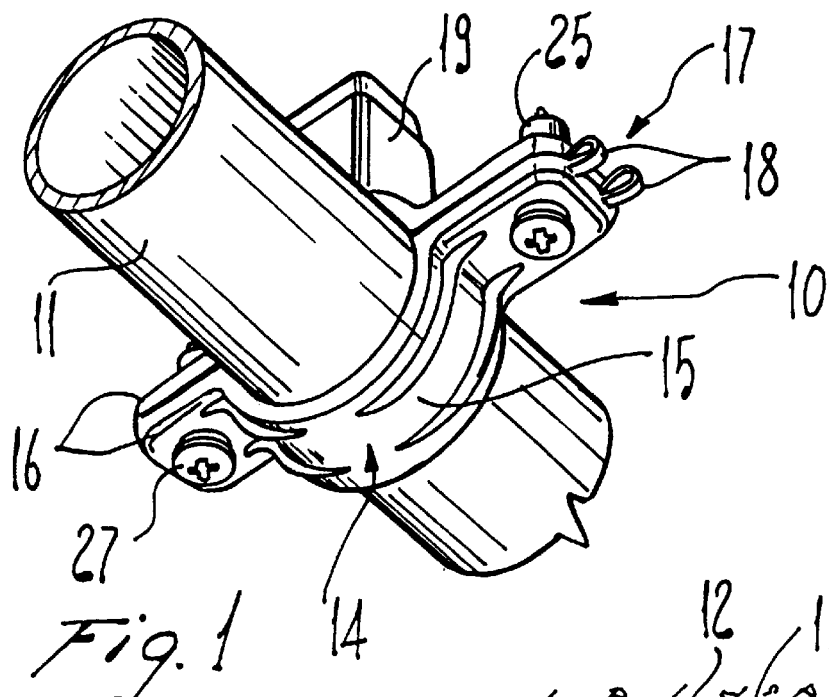
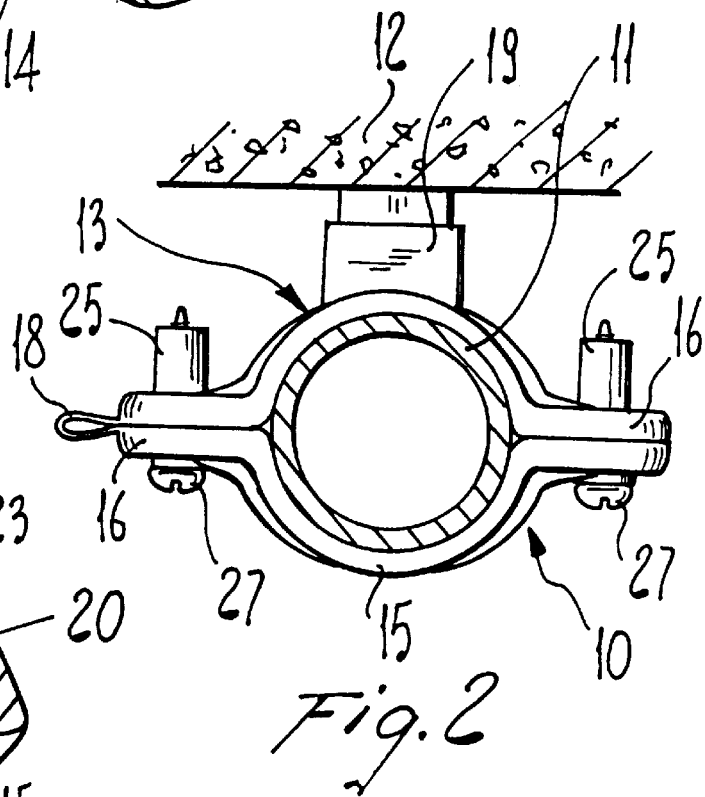
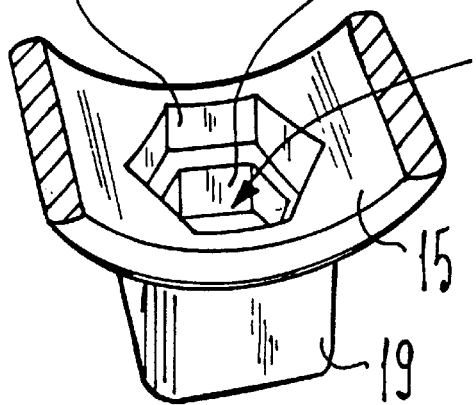

PIPE CLAMPING APPARATUS

The present invention relates to an improved pipe clamping apparatus.

BACKGROUND OF THE PRIOR ART

Pipe clamping apparatuses used to apply and fasten water delivery, gas supply or ventilation pipes on a support element, such as for instance a wall, are largely known and available on the market in a great variety of types.

Such pipe clamping apparatuses are usually built on a structure that includes a base which adapted to be fastened to the support element and from which a first wing extends.

This first wing combines with a second, substantially complementary one, with which it links up so as to form, upon the interposition of a pipe between them, a ring that encloses and supports the pipe.

These two wings are assembled together through the use of fastening means of a more or less releasable or loosenable type, such as for instance, bolts, hooks and the like.

Similarly, even the base is fastened on to the support element through the use of fastening means such as for instance dowels, screw anchors or the like.

Upon fastening the base to the support, those who are installing the pipe, therefore, shall first of all succeed in correctly applying the pipe before being able to join the two wings together and fasten them.

Quite often, the above mentioned apparatuses are made of iron, steel or cast-iron, so that they usually have a great drawback because they are rather heavy.

Furthermore, they also have a drawback because they require the need for sheaths of plastic material to be used supplementarily in combination with the metal pipe clamping apparatuses, between the same pipe clamping apparatuses and the pipe, to perform a noise deadening, damping function.

In the current practice, the procedure to be followed for applying and fastening the pipes requires a considerable extent of operational difficulties, considering that the need arises for the pipe to be supported and, at the same time, the two wings of the apparatuses to be handled accordingly in view of joining and assembling them together, for instance through the use of self-tapping screws.

This practically means that, sometimes, in addition to a certain slowness in carrying out and completing the whole pipe assembly operation, the need arises for more fitters or installers to be involved in order to cope with a single length of pipe to be installed.

In order to make it easier and quicker for pipes to be installed in a more accurate manner, including both the correct positioning and the actual fastening of the pipe, pipe clamping apparatuses have been developed which have their two wing hinged on to each other.

Such apparatuses are certainly more convenient and handy to use. However, they by no means do away with the afore cited difficulty in connection with the need for the installer to hold, ie. support the pipe and, at the same time, try to tighten the screws.

SUMMARY OF THE INVENTION

It therefore is a main object of the present invention to provide a pipe clamping apparatus that is capable of doing away with all of the above cited drawbacks typically encountered in prior-art types.

In connection with such a main, another purpose of the present invention is to provide an improved pipe clamping apparatus that is capable of allowing for an extremely convenient installation.

It is a further object of the present invention to provide a pipe clamping apparatus that is capable to be produced in practice with a simple process.

It still is another particular object of the present invention to provide a pipe clamping apparatus which is available to the pipe installer with all of its component parts in a pre-assembled condition.

A further object of the present invention is to provide a pipe clamping apparatus that is capable of being manufactured, or anyway put together, without any need arising for particular equipment or special technologies to be used.

A still further object of the present invention is to provide a pipe clamping apparatus which is capable of ensuring an adequate extent of tensile and flexural strength.

Another major object of the present invention is to provide a pipe clamping apparatus that is fully capable of withstanding the whole set of stresses it undergoes in its use throughout its life.

Both these main and supplementary object as recited above, along with further ones that will be more clearly understood in the following description of the invention, are reached in a pipe clamping apparatus of the single-piece type, which comprises a first and a second arcuate wing, wherein such wings are joined to each other through a hinge that regulates their mutual arrangement from an open position to a closed position in which said arcuate wings are linked up with each other so as to form a pipe supporting ring, said apparatus being substantially characterized by the fact that said arcuate wings comprise end portions for engaging each other, in which through-holes are provided for inserting screws therein, along with corresponding receptacles for the engagement of said screws, as well as by the fact that from the first one of said arcuate wings there extends a hollow box-like base defining a through-hole that is so shaped as to form at least a receptacle which, being accessible from said ring, is capable of accomodating a nut for fastening to a support element, at least a tab for partially obstructing the accessibility thereof extending from each one of said through-holes of said end portions, wherein said screws, which are pre-assembled into said through-holes, are so prevented from sliding axially.

BRIEF DESCRIPTION OF THE DRAWINGS

Further features and advantages of the present invention will be more clearly and readily understood from the description that is given below by way of non-limiting example with reference to the accompanying drawings, in which:

FIG. 1 is a perspective view of a pipe clamping apparatus according to the present invention, in its assembled condition FIG. 2 is a front view of a pipe clamping apparatus according to the present invention;

FIG. 3 is an exploded view of a detail of a pipe clamping apparatus according to the present invention;

Figure 4:
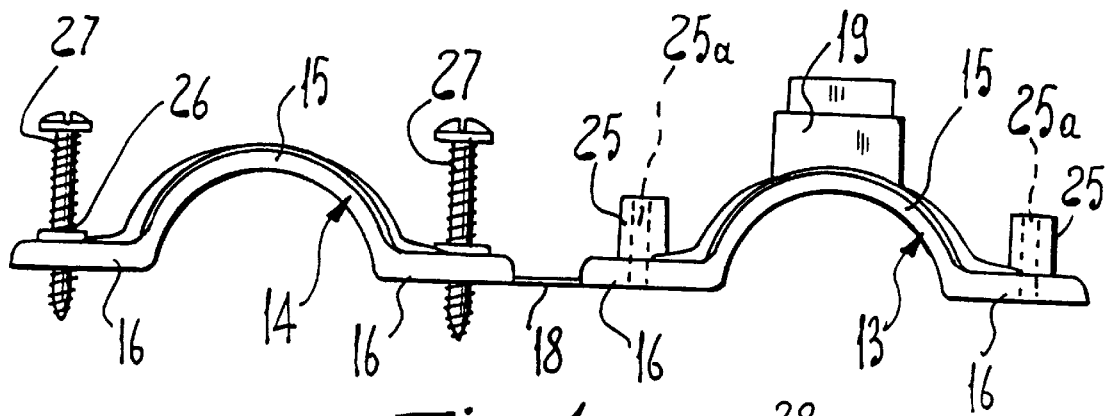
FIG. 4 is a front view of a pipe clamping apparatus according to the present invention, in its opened condition.
Figure 5:
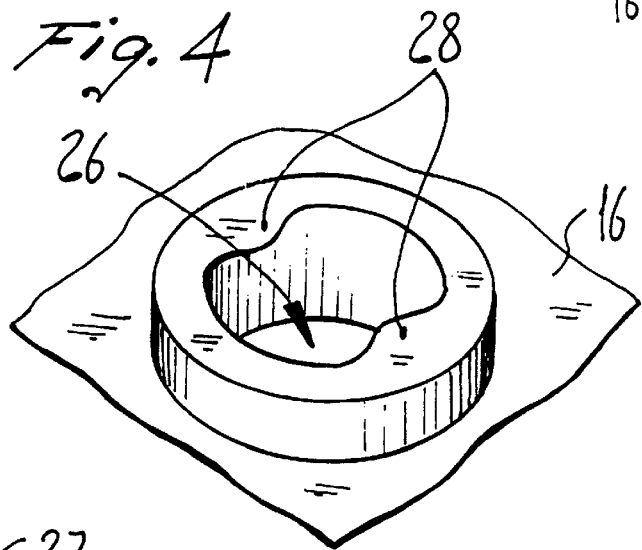
FIG. 5 is a perspective view of a detail of a pipe clamping apparatus according to the present invention.
Figure 6:
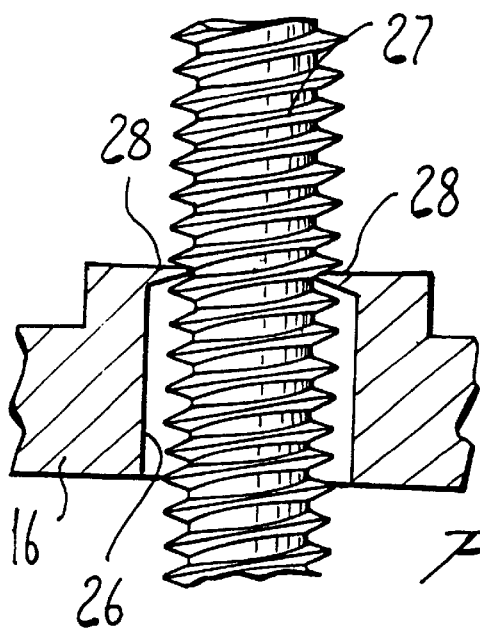
FIG. 6 is a sectional view of a detail of a pipe clamping apparatus according to the present invention.

Referring now to the above listed Figures, it can be noticed that a pipe clamping apparatus according to the present invention is generally indicated at 10 and is used to apply and fasten a pipe 11 to a support element 12, such as for instance a wall or a ceiling or the like.

Said pipe clamping apparatus 10 comprises a first and a second arcuate wing, said wings being indicated at 13 and 14, respectively, and being mutually complementary, wherein each one of them is formed by a central semi-annular portion 15 and flat end portions 16.

Said two arcuate wings 13 and 14 are joined to each other by means of a hinge 17 formed by two parallel film-like portions 18 that extend from a flat end portion 16 of the first arcuate wing 13 to a corresponding flat end portion 16 of the second arcuate wing 14.

In particular, this said hinge 17 enables this two arcuate wings 13 and 14 to be moved from an opened position, in which said wings 13 and 14 are practically aligned, ie. brought into a single line in a side-by-side configuration, to a closed position in which they are on the contrary facing each other so as to form, with the respective semi-annular portions 15 thereof, a ring adapted to hold and support the pipe 11.

In particular, a hollow box-like base 19 extends from said first arcuate wing 13 in correspondence of the outer surface of the semi-annular portion 15, a through-hole 20 accessible from said semi-annular portion 15 being provided in said base 19.

The through-hole 20 is so shaped as to form, starting from said semi-annular portion 15, a first hexagonal receptacle 21 adapted to accomodate a corresponding first nut 22, a second receptacle 23, which is again hexagonal in its shape, but has a smaller size, in correspondence of the outermost portion of the through-hole 20, said second receptacle being adapted to accomodate a corresponding second nut 24.

Furthermore, the first arcuate wing 13 is additionally provided, on each outer face of the flat end portions 16, a bush 25 that defines an axial opening 25a.

Correspondingly, on each one of the flat end portions 16 of the second arcuate wing 14 there is provided a through-hole 26 which, when the wings 13 and 14 are brought into their closed position, is coaxial with and has a larger diameter than the hole defined by the bushes 25.

The bushes 25 and the through-holes 26 are adapted to accomodate self-tapping screws 27.

Each self-tapping screw 27 passes in succession through a through-hole 26 and into the corresponding bush 25, thereby contributing to a correct coupling of the two arcuate wings 13 and 14 with each other because it causes the respective flat end portions 16 thereof to perfectly fit upon each other.

In particular, two tabs 28 are provided in correspondence of the outer access aperture of each through-hole 26, said tabs being arranged longitudinally according to the development of the arcuate wings 13 and 14, and being adapted to prevent the self-tapping screws 27 inserted in said through-holes from sliding away or falling off.

The assembly of the pipe clamping apparatus 10, which starts from a condition in which said arcuate wings 13 and 14 are in their opened position, calls for the pipe 11 to be placed in its correct position in the apparatus. The arcuate wings 13 and 14 can now be brought into their closed position and fastened together by tightening said self-tapping screws 27.

In fact, the self-tapping screws 27 bite with interference down into the bushes 25, since the holes of such bushes have a smaller diameter than the shanks of the same screws 27.

It is of paramount importance now to notice how the pipe clamping apparatus 10 according to the present invention is actually made as a single piece of plastic material.

In particular, the hinge 17, that is practically provided by the action of the two film-like portions 18, has a thickness of plastic material which is appropriately reduced in view of making the articulation possible.

Such pipe clamping apparatus 10 requires the first or the second nut 22 or 24 to be accomodated in one of said pre-arranged first or second hexagonal receptacles 21 or 23, respectively, in accordance with the actual size of the corresponding means used for fastening to the support element 12, while the self-tapping screws 27 must be inserted, by exerting a slight pressure thereupon, in the two through-holes 26, so that they become in this way restrained by the two tabs 28 which prevent them from freely sliding axially, whereas they enable them to be displaced axially through tightening or by sliding under a certain friction.

The two self-tapping screws 27 cannot in this way fall off the through-holes 26, in which they are inserted, but under the action of a person that intentionally removes by overcoming a certain friction.

In particular, the two tabs 28 which are provided in the outer aperture of the through-holes 26 allow for the self-tapping screws 27 to only move in a single direction, ie. in the direction of the longitudinal extension of the two arcuate wings 13 and 14.

Such a freedom of movement makes it possible for the arcuate wings 13 and 14 to be effectively joined and fitted together in accordance to the particular configuration of the pipe 11.

In practice it has been fully demonstrated how the present invention is fully capable of complying not only with its main aim, but also all other complementary aims.

An important advantage is obtained with the present invention in because it enables a pipe clamping apparatus to be provided which can be handled most easily and conveniently, since it is ready and available for use in a fully pre-assembled condition, as well as without any risk of losing any piece thereof.

A further significant advantage is obtained with the present invention in because it enables a pipe clamping apparatus to be provided which is particularly suitable for applications involving the installation of pipes under particularly uncomfortable, inconvenient conditions, such as in the case of particular scaffoldings or staircases.

A further advantage is obtained with the present invention in because it provides a pipe clamping apparatus which is made in a single piece.

A significant advantage is again obtained with the present invention in because it provides a pipe clamping apparatus that can be most easily manufactured in practice through a process for moulding plastic material.

Another advantage is reached with the present invention in because it provides a pipe clamping apparatus which has an extremely low weight.

Still a further advantage is reached with the present invention in because it provides a pipe clamping apparatus that has a very good tensile and flexural strength.

A further advantage is ensured by the present invention in because it provides a pipe clamping apparatus that does not oxidize and has a remarkable durability.

Still another advantage is ensured by the present invention because it provides a pipe clamping apparatus which does not require any supplementary use of insulating sheaths to noise deadening, damping purposes.

Any material can be used and the apparatus can be given any suitable size in accordance with the requirements of the particular application.

What is claimed is:

1. A single piece pipe clamping apparatus comprising a first arcuate wing (13) and a second arcuate wing (14) joined to each other by a hinge (17), said hinge regulating the mutual arrangement thereof from an open position in which said wings are essentially aligned in a side-by-side configuration, to a closed position in which they are faced to each other, each wing being formed by a central semi-annular portion (15) having an outer surface and a flat end portion (16), the end portion (16) of one of said first and second arcuate wings (13, 14) having through-holes (26), the end portion (16) of the other of said first and second arcuate wings (13, 14) having openings (25a), whereby said wings in the closed position are fitted together to form a pipe holding ring wherein through-holes (26) are aligned with openings (25a) and are adapted to receive therein screws (27) for securement, the apparatus further comprising a hollow box-like base (19) extending from the outer surface of the semiannular portion (15) of one of said first and second arcuate wings (13, 14), said box-like base (19) having a through-hole (20) shaped so as to form at least one receptacle (21) accessible from said ring to accommodate a nut (22) for fastening to a support element, and at least one tab (28) extending in each of said through-holes (26) partially obstructing the accessibility thereof and adapted to hinder screws (27) from sliding axially.

2. The pipe clamping apparatus according to claim 1, wherein said screws (27) are self-tapping screws.

3. The pipe clamping apparatus according to claim 2, wherein said openings (25a) are axially formed in bushes (25) provided on said end portion (16), openings (25a) have a diameter comprised between the core diameter and the outer diameter of said self-tapping screws (27).

4. The clamping apparatus according to claim 1, wherein each of said through-holes (26) has two parallel tabs (28) for partially obstructing the accessibility of said through-holes (26).

5. The clamping apparatus according to claim 4, wherein said tabs extend parallel to the direction along which said arcuate wings extend.

6. The clamping apparatus according to claim 1, wherein said through-hole (20) provided in said box-like base (19) is shaped so as to form a first and a second receptacle to accommodate a first nut (22) and a second nut (24).

7. The clamping apparatus according to claim 1, wherein said apparatus is formed of plastic material.

* * * * *